INVENTORS
EUGENE T. KOZOL
JOSEPH P. PAWLETKO

United States Patent Office 3,443,181
Patented May 6, 1969

3,443,181
DRIVE CIRCUIT FOR CARRIAGE
STEPPING MOTOR
Eugene T. Kozol, Binghamton, and Joseph P. Pawletko,
Endwell, N.Y., assignors to International Business Machines Corporation, Armonk, N.Y., a corporation of
New York
Filed Mar. 28, 1966, Ser. No. 537,913
Int. Cl. H02k 29/02; H02p 3/08
U.S. Cl. 318—138                              6 Claims

ABSTRACT OF THE DISCLOSURE

A counter driven by pulses from a ramp-controlled variable frequency pulse generator applies a predetermined number of pulses at gradually decreasing intervals to a stepping motor. At the predetermined count the pulse generator is stopped and delay circuits apply independently of the pulse generator a predetermined number of stop pulses to the motor at successively greater intervals to bring the motor to a stop.

---

This invention relates generally to motor control circuits and it has reference in particular to a control circuit for a stepping motor driving a carriage in a printer.

Generally stated, it is an object of this invention to provide a simple and accurate control circuit for a stepping motor to obtain incremental drive of a carriage in a printer.

More specifically, it is an object of this invention to provide for using a variable frequency voltage controlled pulse generator with a counter for applying a predetermined number of pulses to a stepping motor at decreasing intervals of time for starting the motor and bringing it up to speed.

Another object of this invention is to provide for applying pulses to a stepping motor at decreasing intervals of time to bring it up to speed and for stopping the motor by applying pulses at increasing intervals of time.

Yet another object of this invention is to provide for applying pulses to a stepping motor at decreasing intervals of time to accelerate it, stopping the motor with pulses spaced at increasing intervals of time, and holding the motor in the stopped poisiton with a reduced detent voltage.

Still another object of the invention is to provide for using a counter controlled by a variable frequency voltage controlled pulse generator for selectively energizing the windings of a stepping motor to cause it to step a predetermined number of steps and for utilizing a switch device for applying a relatively high voltage to the operating circuit during operation, and disconnecting a portion of the operating circuit from ground to provide a relatively low voltage detent circuit when not operating the motor.

In a preferred embodiment of the invention a variable frequency voltage controlled oscillator is activated by a start signal to drive a counter for applying a predetermined number of pulses at decreasing intervals of time to the phase windings of a stepping motor to obtain a predetermined carriage advance. The counter stages control switches for each of a plurality of the motor windings through a pedestal switch providing a common low impedance return during operation. At the end of the predetermined count the start signal is removed unless more than a single skip operation is indicated. Delay devices produce a pair of timed stop pulses which are spaced at gradually increasing intervals to bring the motor to a stop after which the pedestal switch is turned off to remove ground from a stepping resistor portion of the circuit to provide a relatively low voltage detent current circuit to hold the motor in the stopped position.

The foregoing and other objects, features and advantages of the invention will be apparent from the following more particular description of a preferred embodiment of the invention, as illustrated in the accompanying drawings.

Figure 1:
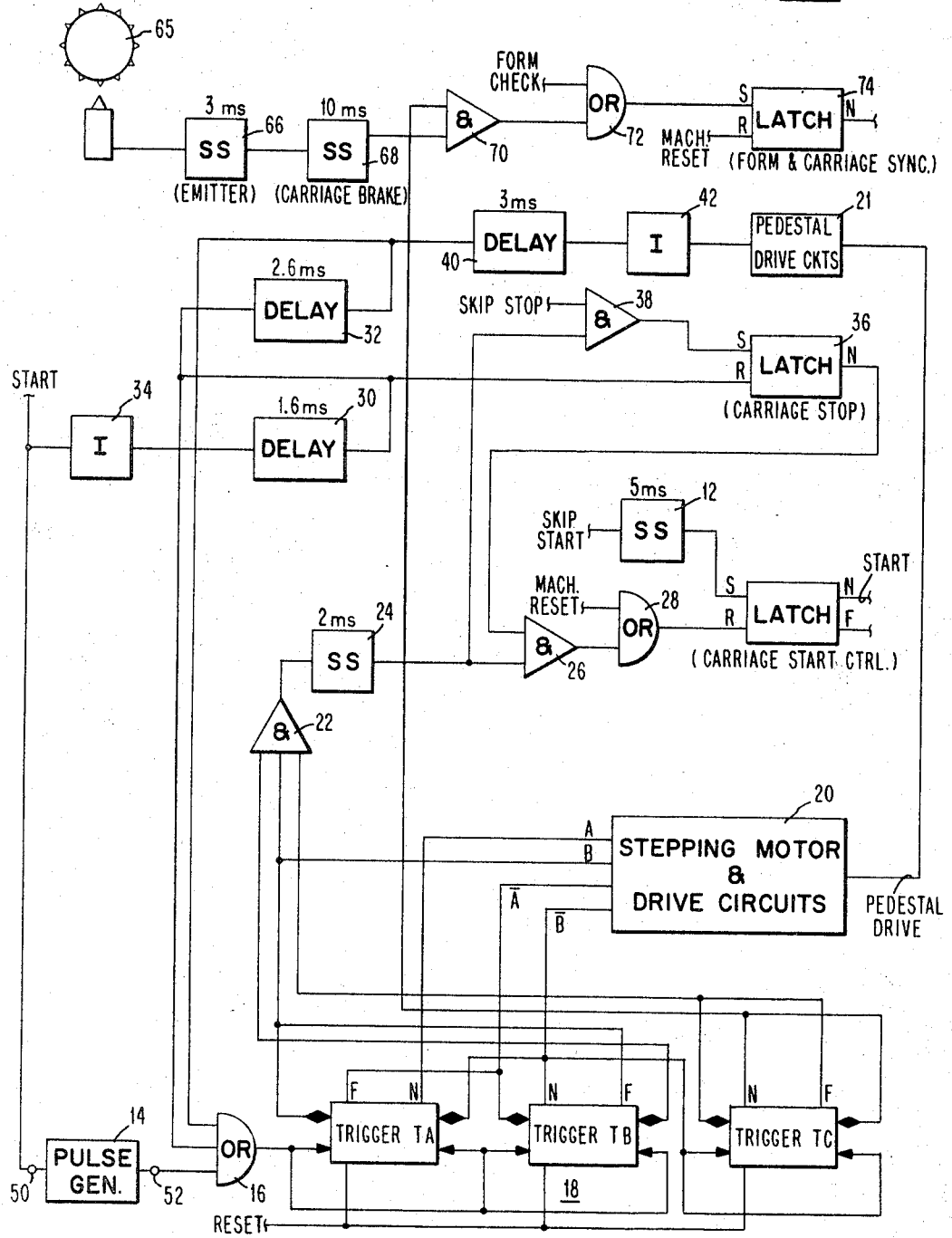
FIGURE 1 is a schematic diagram of a stepping motor control circuit for a carriage drive embodying the principal features of the invention.

Referring particularly to FIGURE 1 of the drawings it will be seen that a bistable device designated as a Carriage Start Control Latch 10 is provided for operating in response to a Skip-Start signal from the controls of a printer and through a single shot 12 for producing a Start signal to effect operation of a pulse generator 14. Pulses are applied from the generator 14 through OR circuit 16 to a reflected binary counter 18 which includes triggers TA, TB, and a four counter trigger TC. The outputs of the triggers TA and TB are applied to a Stepping Motor Drive and Circuits 20, which in conjunction with Pedestal Drive Circuit 21 effects operation of a carriage stepping motor.

In order to provide for effecting a predetermined advance of the stepping motor for each line advance of the carriage, AND circuit 22 is connected to the outputs of the triggers TA, TB and TC to provide an output signal upon a count of six pulses. AND circuit 22 is connected through a single shot 24 to AND circuit 26 for applying a reset signal to the Carriage Start Control Latch 10 through OR circuit 28.

In order to provide for stopping the stepping motor in response to removal of the Start signal, delay devices 30 and 32 which are connected in cascade, are utilized to provide first and second stop signals. They are connected to be energized through inverter 34 in response to termination of the Start signal. Each of the delay devices 30 and 32 is connected to advance the counter 18 through OR circuit 16 by applying pulses at 1.6 and 2.6 milliseconds, respectively.

Reset of the Carriage Start Control Latch 10 is effected through AND circuit 26 in response to the output of the single shot 24 together with an output signal from a Carriage Stop Latch 36 which is turned on by the outputs of AND 38 in response to a Skip-Stop Signal.

The Pedestal Drive Circuit 21 is turned on in response to a Start signal through inverter 34, delay device 30, delay device 32 and delay device 40 and inverter 42, without any delay, upon initiation of an operation, and is turned off approximately three milliseconds after the second Stop pulse which is provided by the delay device 32, by reason of the delay introduced by delay device 40. The delay devices 30, 32, and 40 may be of the fast recovery delay type for a signal in one direction and introducing a predetermined delay in response to a change of signal in the opposite direction, such as disclosed on page 197 of the August 1964 IBM Technical Disclosure Bulletin.

Figure 2:
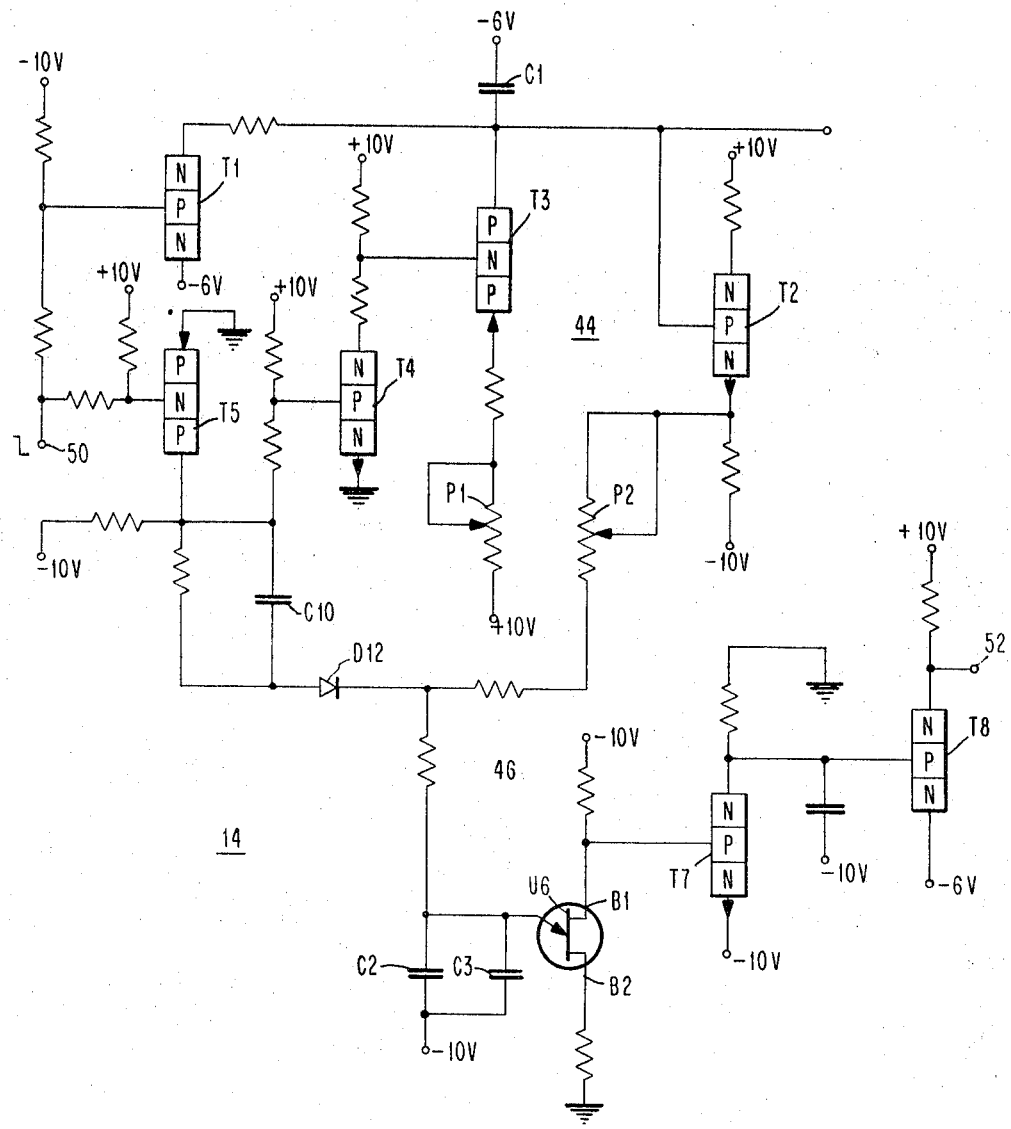
FIGURE 2 is a circuit diagram of a voltage controlled variable frequency oscillator such as may be used in the circuit of FIGURE 1.

Referring to FIGURE 2 it will be seen that the pulse generator 14 may comprise a variable voltage source 44 for operating a variable frequency oscillator 46. The variable voltage source may comprise a capacitor C1 which is connected to be charged from a constant current source through a transistor T3 in conjunction with a slope control potentiometer P1. The capacitor C1 is normally shunted by a transistor T1 which is turned off by a negative going signal applied into the input terminal 50. This signal is also applied to the base of a control transistor T5 which in turn turns on a transistor T4 which is operable to render the transistor T3 conductive. A transistor T2 connected in an emitter follower configuration provides an output voltage through a frequency control potentiometer P2 for application to capacitors C2 and C3, which with a unijunction transistor U6 form a relaxation oscillator. The Base 1 voltage of the transistor U6 is applied to the base of an amplifier transistor T7 for controlling an output transistor T8 for application to the output terminal 52 of the pulse generator. A capacitor C10 is connected through a diode D12 for applying an initial starting pulse to the unijunction oscillator when the transistor T5 is turned on. Thereafter the rising voltage output of the transistor T2 causes the oscillator to oscillate at a gradually increasing frequency to produce progressively closer spaced output pulses, as shown by the first curve of FIGURE 4.

Figure 3:
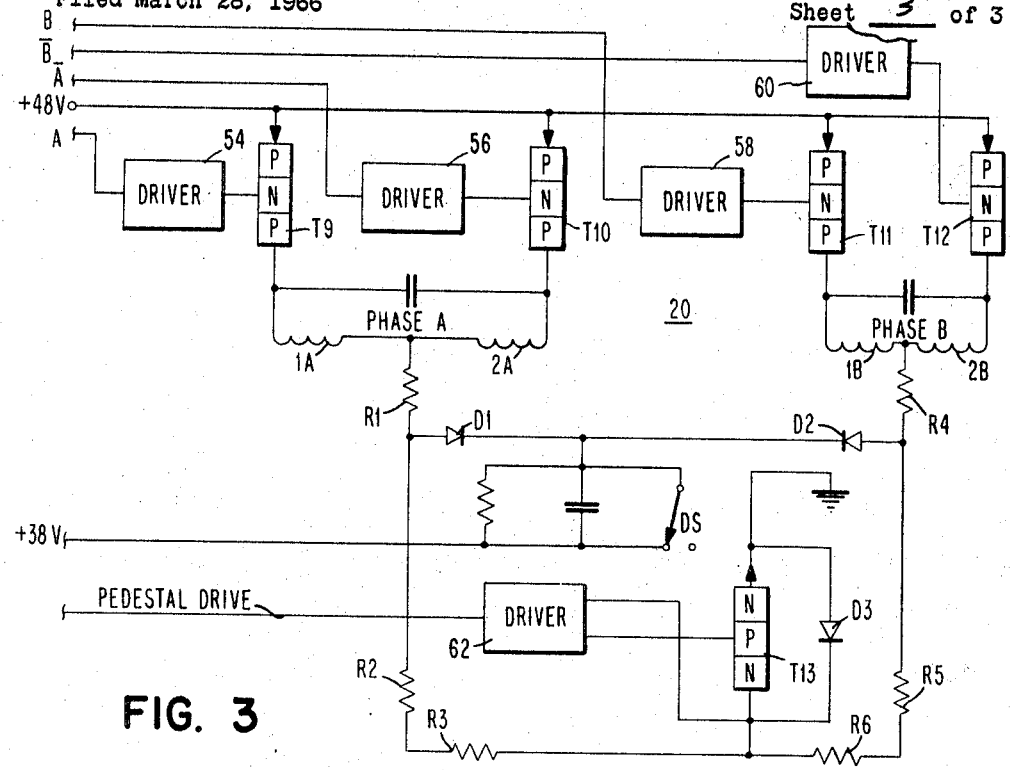
FIGURE 3 is a circuit diagram of the stepping motor and pedestal drive circuits used in the circuits of FIGURE 1.

Referring to FIGURE 3 it will be seen that the Stepping Motor and Drive Circuit 20 may comprise transistors T9 and T10 connected to energize the windings 1A and 2A of Phase A of the stepping motor through drivers 54 and 56 respectively. The stepping motor may be of a well known type such as described in detail in AIEE Paper 61–650 presented at the North Eastern District Meeting, May 17–19, 1961, in Hartford, Conn., by Arthur E. Snowdon and Elmer W. Madsen. Transistors T11 and T12 are likewise connected for switching windings 1B and 2B of Phase B of the motor in response to operation of drivers 58 and 60. Drivers 54, 56, 58 and 60 are connected to the A, not A, B, and not B outputs, respectively, of the triggers TA and TB of FIGURE 1. The Phase A windings of the motor are connected through resistors R1, R2, R3 and to ground through a pedestal transistor T13 which is controlled by a driver 62 in response to the Pedestal Drive Output of the pedestal drive circuits 21 of FIGURE 1. The Phase B windings of the motor are similarly connected through resistors R4, R5, R6 to ground through the pedestal switch transistor T13.

The emitters of the transistors T9, T10, T11, T12 are connected to a plus 48 volt source. A holding or detent circuit for the motor is proved through detent diode D1 and D2 and a normally closed disable switch DS to the 38 volt terminal of the same source so as to provide approximately 10 volts for circulating direct current through whichever of Phase A and Phase B windings are energized when the motor is in a stopped position.

In operation, receipt of a Skip-Start signal produces a five millisecond output signal from the single shot 12 to turn on the Carriage Start Control Latch 10. This supplies a Start signal to the pulse generator 14 causing it to produce gradually closer spaced output pulses as shown by the first curve of FIGURE 4. These pulses are applied through OR circuit 15 to advance the counter 18 as shown by the curves Phase A, Phase B and TC of FIGURE 4. The outputs of the triggers TA and TB are switched to effect sequential energization of the phase windings 1A, 2A, 1B, 2B of the stepping motor through the transistors T9, T10, T11 and T12 with a return current being provided through the pedestal T13 which is turned on to provide a ground connection for R3 and R6, by the Start signal through inverter 34, delay devices 30, 32 and 40, without delay.

Figure 4:
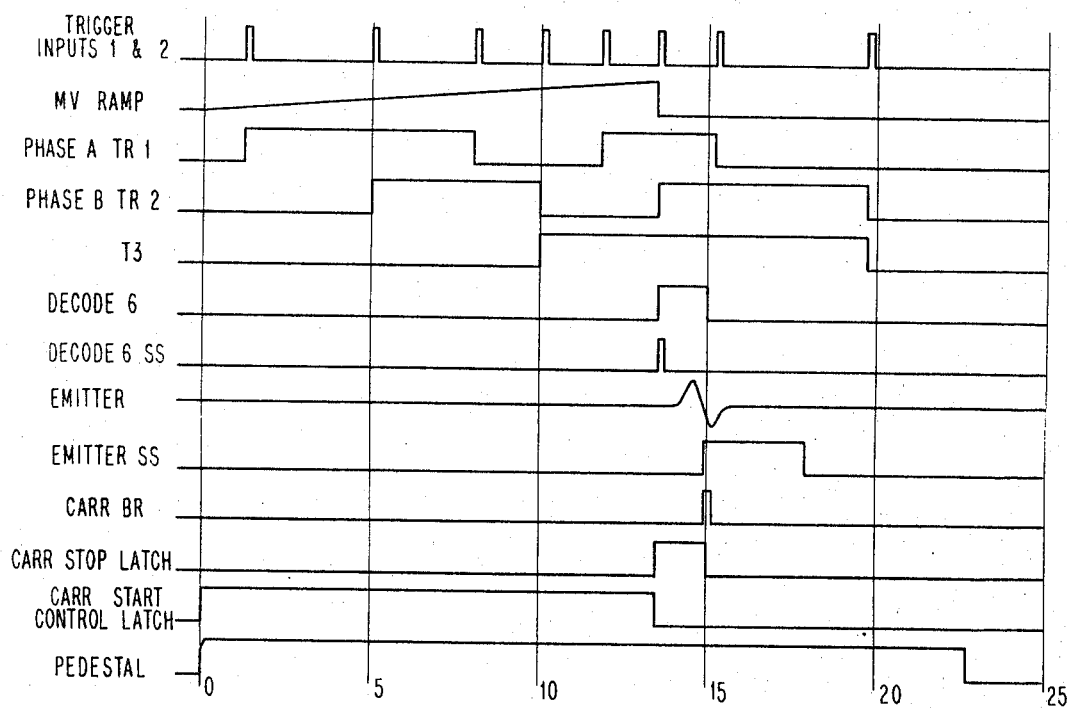
FIGURE 4 illustrates typical timing curves for the circuit of FIGURE 1.

When a count of 6 is reached by the counter 18, AND circuit 22 turns on the single shot 24 which provides a decode 6 signal and a Decode single shot signal as shown in FIGURE 4. As a Skip-Stop signal has been applied to the AND circuit 38, the Carriage Stop Latch 36 will be set upon the occurrence of the single shot signal turning on AND 26 to produce a signal from OR 28 for turning off the Carriage Start Control Latch 10. Turn off of the latch 10 removes the input from the inverter 34, which after a delay produces an output from delay 30 which is applied to the counter 18 for producing the first stopping pulse through OR 16. After a second delay determined by the delay device 34, a second delay pulse is applied to the counter 18 through the OR 16, which results in all of the triggers being turned off after two delay pulses are provided to the motor drive circuit by the off output of trigger TA and the off output of trigger TB in sequence. The motor is brought to a stop by these delay pulses, and three milliseconds after the second delay pulse, delay device 40 provides an output which is inverted by inverter 42 to turn off the pedestal drive circuit and disconnect R3 and R6 from ground by turning off the drive 62 and the transistor T13, whereby windings 2A and 2B remain connected between +48 and +38 to provide a reduced detent voltage.

To provide for checking operation of the carriage drive, an emitter 65 is provided for applying pulses through 68 to an AND circuit 70 in which is gated the on outputs of the trigger TC. If the emitter pulse does not occur during the on output of trigger TC a signal is applied through OR circuit 72 to operate a Carriage Sync Latch 74 for indicating out-of-synchronism condition.

While the invention has been particularly shown and described with reference to the preferred embodiment thereof, it will be understood that various changes in form and details may be made therein without departing from the spirit and scope of the invention.

What is claimed is:

1. A control circuit for a pulse operated stepping motor having a plurality of operating windings comprising:
   a variable frequency voltage controlled pulse generator having circuit means connected to apply a gradually rising voltage to said pulse generator to cause it to produce accelerating output pulses at gradually decreasing intervals,
   a counter connected to be operated by pulses from the pulse generator,
   switch means connected to be operated by the counter to selectively effect energization of the stepping motor windings in response to said pulses to effect stepping operation of said motor; and
   means including circuit means connected to said counter operable in response to a predetermined number of such accelerating pulses for producing a predetermined number of signals independently of the pulse generator at successively greater intervals for effecting operation of the switch means to stop the motor.

2. A control circuit as defined in claim 1 characterized by the counter comprising a multistage binary counter of bistable devices having on and off outputs of which the first two stages are connected to apply on and off output signals to said switch means for operating the same.

3. A control circuit as defined in claim 2 characterized by the switch means being connected to control power transistors for normally energizing the motor windings with a reduced value holding voltage and a common pedestal switch device is connected in series with stepping resistors for grounding them during operation of the stepping motor to provide an increased forcing voltage for the motor windings.

4. A control circuit as defined in claim 3 characterized by the last-mentioned means of claim 1 comprising a plurality of cascaded delay devices for applying stop signals to the counter at predetermined increasing intervals to effect stopping of the motor in response to a predetermined count by the counter.

5. A control circuit as defined in claim 4 characterized by a carriage start control bistable device having on and off outputs, said bistable device being turned on by a start signal and connected to apply its on output to effect operation of the voltage controlled generator, and said bistable device being connected to said counter to be turned off at a predetermined pulse count for applying a signal to said cascaded delay devices for producing stop signals at increasing intervals of time to bring the motor to a stop.

6. A control circuit as defined in claim 5 characterized by the carriage start control bistable device being reset by a logic AND circuit connected to respond to predetermined stages of the binary counter, an inverter is connected to said bistable device for applying a signal to the cascaded delay devices for operating the counter to produce outputs at increasing intervals of time to effect stopping of the motor; and an additional delay device is connected in series with the aforesaid cascaded delay devices for producing a signal for turning off the pedestal switch device.

References Cited

UNITED STATES PATENTS

| | | | |
|---|---|---|---|
| 3,109,974 | 11/1963 | Hallmark | 318—163 |
| 3,109,131 | 10/1963 | Byrd | 318—138 |
| 3,241,017 | 3/1963 | Madsen et al. | 318—138 |
| 3,328,658 | 6/1967 | Thompson | 318—138 |
| 3,109,974 | 11/1963 | Hallmark | 318—163 |

B. DOBECK, *Primary Examiner.*

G. R. SIMMONS, *Assistant Examiner.*

U.S. Cl. X.R.

318—18

UNITED STATES PATENT OFFICE
CERTIFICATE OF CORRECTION

Patent No. 3,443,181                                            May 6, 1969

Eugene T. Kozol et al.

It is certified that error appears in the above identified patent and that said Letters Patent are hereby corrected as shown below:

Column 6, line 10,
    3,109,974    11/1963    Hallmark ------- 318-163 should read 3,354,367    11/1967    Stockebrand ---- 318-138

Signed and sealed this 21st day of April 1970.

(SEAL)
Attest:

Edward M. Fletcher, Jr.                      WILLIAM E. SCHUYLER, JR.
Attesting Officer                                  Commissioner of Patents